(12) United States Patent
Crinon

(10) Patent No.: US 6,940,876 B1
(45) Date of Patent: Sep. 6, 2005

(54) SYSTEM TARGET DECODER WITH SECONDARY MULTIPLEXING

(75) Inventor: Regis J. Crinon, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/514,138

(22) Filed: Feb. 28, 2000

Related U.S. Application Data

(60) Provisional application No. 60/134,580, filed on May 17, 1999.

(51) Int. Cl.[7] .............................................. H04J 3/04
(52) U.S. Cl. ..................... 370/535; 370/537; 370/542; 701/101; 701/102
(58) Field of Search ............................ 370/395, 395.1, 370/395.64, 395.65, 396, 394, 474, 535, 370/536, 537, 538, 539, 540, 541, 542; 707/101, 707/205, 102, 103

(56) References Cited

U.S. PATENT DOCUMENTS 6,079,566 A * 6/2000 Eleftheriadis et al. ...... 707/101
6,327,275 B1 * 12/2001 Gardner et al. ............. 370/535

* cited by examiner

*Primary Examiner*—Wellington Chin
*Assistant Examiner*—Raj Jain
(74) *Attorney, Agent, or Firm*—Marger Johnson & McCollom P.C.

(57) ABSTRACT

A system target decoder operable to receive and process information. The system target decoder has a first demultiplexer that can demultiplex a transport stream into packets each having a given packet identifier. There are at least two transport buffers that can receive packets with the same packet identifier from the first demultiplexer. The transport buffers transfer the data to a smoothing buffer that in turn sends the data to a second demultiplexer. The second demultiplexer demultiplexes data from within the packets from the smoothing buffer into data access units.

3 Claims, 3 Drawing Sheets

SYSTEM TARGET DECODER WITH SECONDARY MULTIPLEXING

This application is a continuation of U.S. Provisional Patent Application No. 60/134,580, filed May 17, 1999, and claims priority thereto.

BACKGROUND OF THE INVENTION

1. Field of the Invention

This invention relates to systems with coded information transported to the receiver, more particularly to those using MPEG (Moving Pictures Experts Group) transport streams.

2. Background of the Invention

The MPEG standards comprise a group of standards used in transporting information to an audiovisual system receiver, the coding of that information on the transmission end and the decoding of that information on the receiving end. The transmitter multiplexes and sends a stream comprised of three types of information: audio, video and data. This stream is referred to as the transport stream and each sub-stream of a given information type contained within that stream are referred to as program elements.

Typically, an MPEG receiver has three paths along which the data is sent after de-multiplexing. One prior art example is shown in FIG. 1. The decoder 10 receives the transport stream 12 to a demultiplexing stage 14. The demultiplexer handles the program elements and identifies to which path the individual packets inside the program element need to be sent. The identification is found in quantity referred to as the Packet Identifier or PID. For example, demultiplexing stage 14 sends audio packets to a transport buffer 16 which in turn sends the buffered audio packets to a smoothing buffer 18.

Transport buffer 20 receives video packets and in turn send the buffered packets to a smoothing buffer 22. The smoothing buffer 22 sends the data to an elementary buffer 24. A similar path structure would be repeated for data packets with transport buffer 26, smoothing buffer 28 and elementary buffer 30. The functions and nature of the various buffers and their outputs can be seen with reference to FIG. 2 and the video path structure.

Transport buffer 22 has a set size of 512 bytes. The design constraints imposed on MPEG systems require that this buffer cannot suffer from overflow. MPEG-2 program element packets have a predetermined size as well. The packets have 184 bytes of information, referred to as payload, and 4 bytes of header, for a total packet size of 188 bytes. Because of the restrictions on the transport buffer 20, this then governs the delivery schedule for the incoming packets between audio, video and data packets.

This constraint on scheduling is relaxed by the smoothing buffer 22. The smoothing buffer allows the system to control the output rate of the smoothing buffer to the elementary buffer 24. This is called the leak rate. Elementary buffer 24 reconstructs the data access units (DAU) of the initial information stream, and then passes these units to the receiver in the output device, in this case the video display.

The elementary buffer is emptied by removal of the packets at a time determined by an MPEG quantity called the presentation time stamp, or DTS. The DTS is used as a time reference to sequence the data access units into the appropriate order to reconstruct the original information stream. The elementary buffer typically has only one output port, which can restrict the system performance. The Presentation Time Stamp (PTS) defines the instant in time with which the decoded data access unit is associated. In a streaming data elementary stream, the DTS can be inferred from the PTS of the previous DAU in the same stream.

Several proposals have been made to increase system performance. For example, methods to improve the performance of the multiplexing/demultiplexing based upon the PID can be found in U.S. Pat. No. 5,835,493, issued Nov. 10, 1998, and U.S. Pat. No. 5,666,487, issued Sep. 9, 1997. A method involving the multiplexing of the audio stream is shown in U.S. Pat. No. 5,875,007, issued Feb. 23, 1999. Similarly, a method for multiplexing the application data for MPEG-2 packets is shown in U.S. Pat. No. 5,856,973, issued Jan. 5, 1999. All of these approaches rely upon or use multiplexing at the PID level.

Secondary multiplexing within the decoder would increase system performance. One proposal suggests using a second multiplexing stage just prior to the elementary buffer. This has been referred to as FlexMux in the ISO/IEC JTC 1/SC 29 WG 11 on Information Technology—Coding of Audiovisual objects, part 12. However, current proposals rely upon additional information such as headers being sent within the packet payload to direct the demultiplexing operation. This contributes to the system overhead, decreasing system performance and efficiency.

Therefore, a method is needed that allows secondary multiplexing to be performed in video stream decoders that does not require any additional information.

SUMMARY OF THE INVENTION

One aspect of the invention is a target system decoder that receives and processes information with a secondary multiplexing scheme. The decoder has a first demultiplexer that demultiplexes the incoming transport stream into packets and then passes the packets to at least one transport buffer. The transport buffers then pass the packets to a smoothing buffer that in turn passes the data to a second demultiplexer. The second demultiplexer demultiplexes data from within the packets into data access units that are passed to a corresponding data elementary buffer.

Another aspect of the invention includes a means for removing asynchronous data streams from the transport streams separate from the synchronous data handled by the second demultiplexer. The means for achieving this could be a third multiplexer or part of the functionality of the second demultiplexer.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION OF THE PREFERRED EMBODIMENTS

Figures 1, 2:
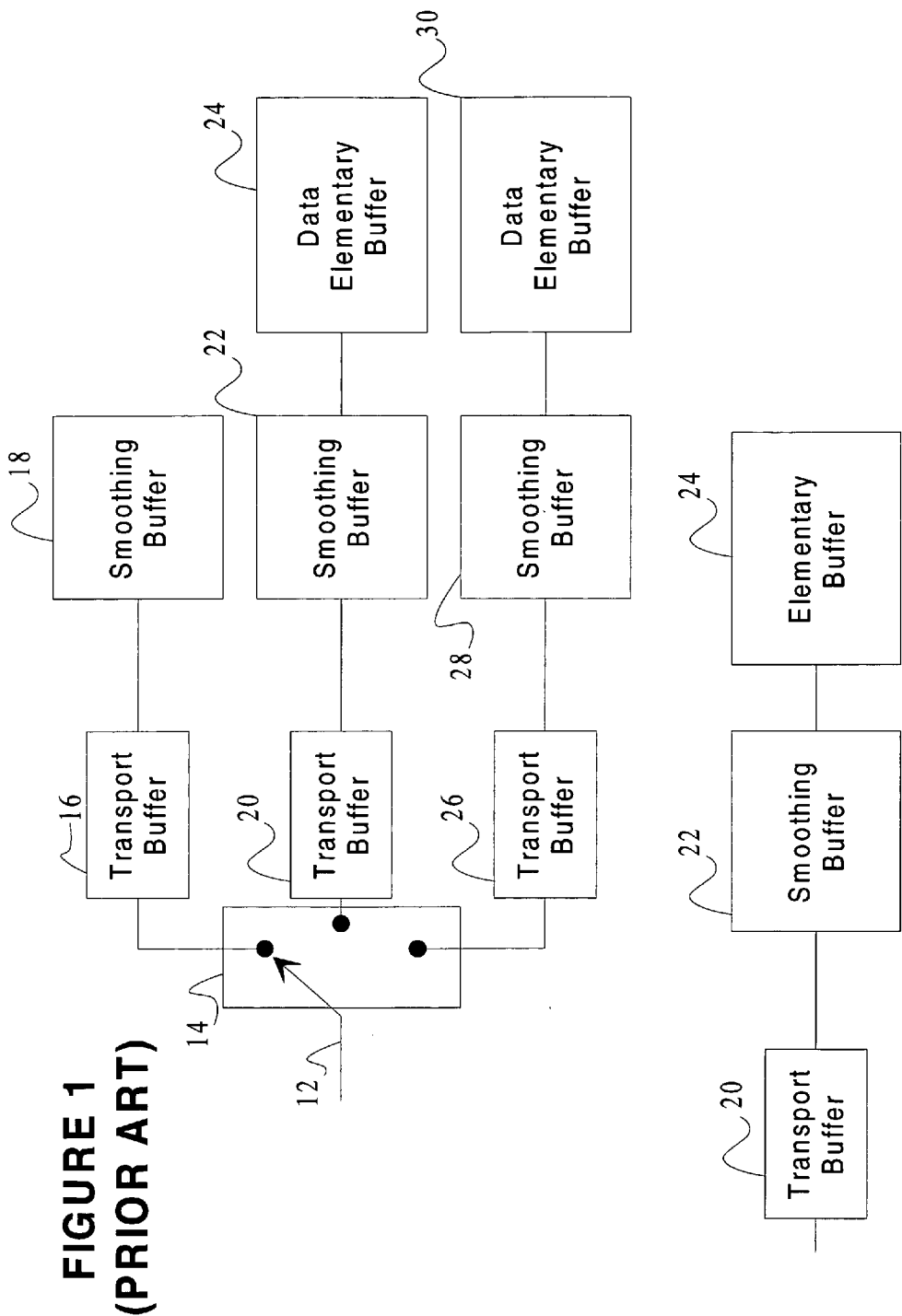
FIG. 1 shows a block diagram representation of a prior art transport stream decoder.
FIG. 2 shows a block diagram representation of a video packet decoding path as part of a transport stream decoder.
Figure 3:
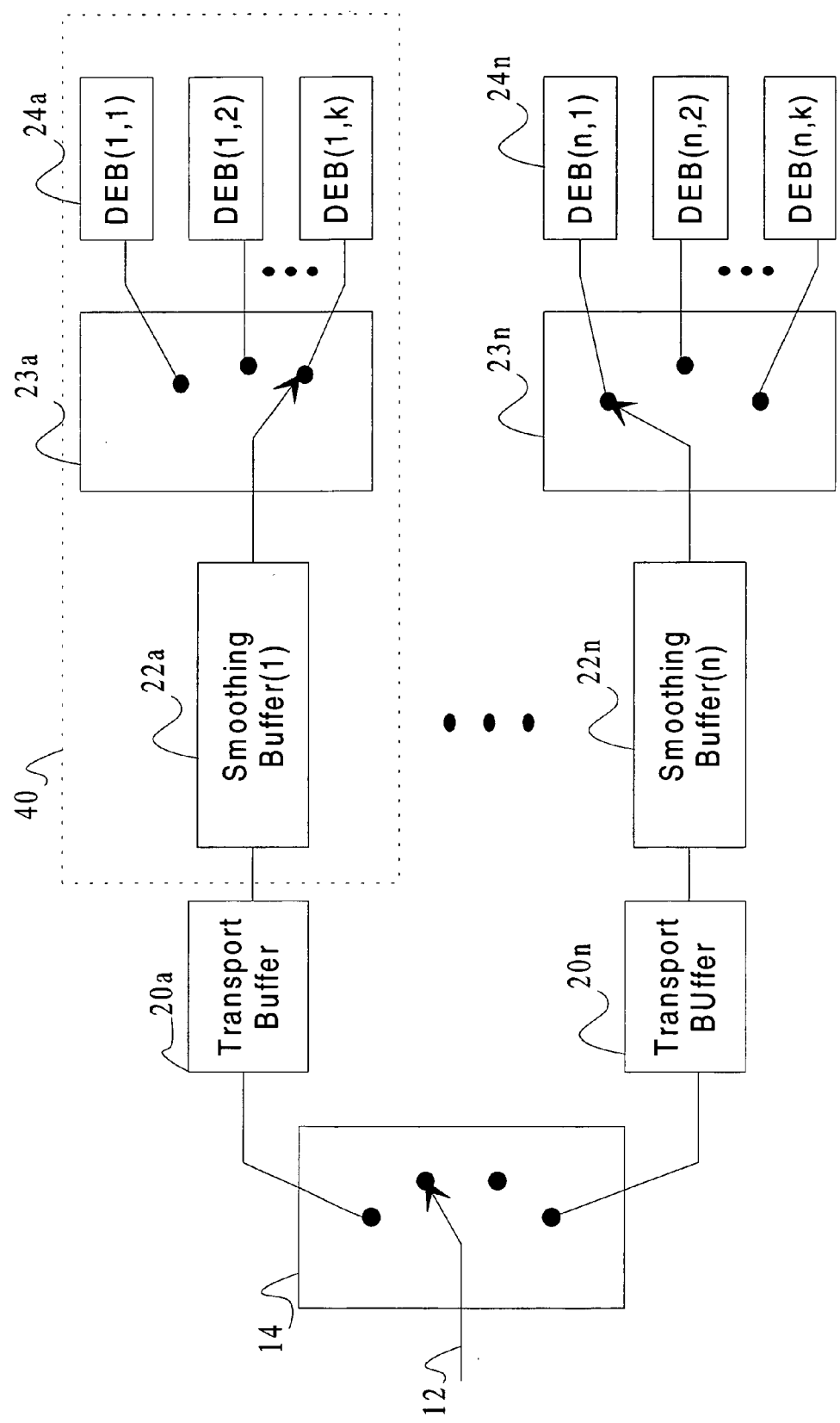
FIG. 3 shows a block diagram representation one embodiment of a transport stream decoder with secondary multiplexing.

FIG. 3 shows on embodiment of a transport stream decoder with a secondary multiplexing stage. As mentioned previously, the idea of using a secondary multiplexer was suggested as part of a proposed revision of the MPEG decoders referred to as FlexMux. However, the current FlexMux proposal involves adding more information within the MPEG packet payload to allow the secondary multiplexer to process the packet properly.

This approach has two major drawbacks. First, the functionality of decoding this extra information has to be included in the target decoder. Second, the additional information has to be provided at the transmission, or authoring end. Currently, neither one of these exists.

The present invention does not require this information, which eliminates the extra authoring on the transmission side. It does require a different structure of the target decoder, but the added structure is minimal compared to the proposed FlexMux structure.

It is helpful in the understanding of the invention to provide a basic overview of MPEG-2 and its associated terminology. In MPEG-2, the audiovisual information to be transmitted is encoded into elementary streams. Elementary streams are continuous streams of encoded data, with no systems information. The elementary streams may be audio or video. For discussion purposes, a video elementary stream will be used.

associated with a stream_type value indicating the type of data conveyed in the elementary stream.

In addition to PES packets, an MPEG-2 transport stream includes sections of tables that transfer other systems information. For example, the program map table (PMT) identifies which PIDs go to which audiovisual events. Several transport packets may be have the same PID, the collection of which is referred to as a program element. A program element may be a video elementary stream, an audio elementary stream, a series of MPEG-2 table sections, etc.

Current receivers typically have limitations as to how many program elements they can acquire. Being able to pack elementary streams of the same type into one program element allows systems to transmit more information without requiring new receivers. The FlexMux approach, above, does not allow this type of packing without requiring implementation of new hardware/firmware.

One of the advantages of the present invention is that it does not require new hardware/firmware. It capitalizes on information already present in the MPEG-2 tables, mentioned above. The tables are broken down into sections, with a field that identifies the section number in the table called the section_number. The tables are used to packetize each data elementary stream into a sequence of data access units (DAU). The DAU is the payload of MPEG sections sharing the same table_id and table_id_extension field values. The data access units are then multiplexed into the same MPEG-2 program element.

The definitions of a typical MPEG section field values and sizes is shown in the following table:

| Field Name | Description | Size (bits) |
| --- | --- | --- |
| table_id | Identifies the content and format of the MPEG section payload, defines particular encoding rules for the table_id_extension | 8 |
| section_syntax_indicator | When set to '0' indicates the presence of a checksum field. It is set to '1' to signal the presence of a CRC_32 field. | 1 |
| section_length | This specifies the number of remaining bytes in the section immediately following this field up to the end of the MPEG section | 12 |
| table_id_extension | The semantics of this field is scoped by the value of the table_id field | 16 |
| version_number | Represents the version number of the MPEG section. | 5 |
| section_number | The number of the current MPEG section. Section numbers start with 0x00 and increments by one for each section | 8 |
| last_section number | This specifies the last section number for this particular MPEG table | 8 |
| checksum | Used for error detection and control, may not be used. | 32 |
| CRC_32 | Contains the CRC value that gives a zero output after processing the entire MPEG section | 32 |

The elementary stream is then packetized into the packetized elementary stream (PES). PES packets can be of variable length and typically contain elementary stream data and a PES header that gives information about those bytes including when the data should be decoded and displayed, referred to as the decode time stamp (DTS) and the presentation time stamp (PTS).

The PES packets are then further divided up into fixed length transport packets for the MPEG-2 transport stream. These packets are currently of 188 bytes, 184 bytes of payload data and 4 bytes of header information. Each transport packet has an identifier, called a PID (packet identifier). The PID contains all the navigation information required to find, identify and reconstruct programs. It is also Referring now to FIG. 3, the operation of the invention can be seen. Transport packets containing the data from a given program element, as indicated by its PID, are passed to the transport buffer for that stream. As can be seen in FIG. 3, the example shows the structures for streams 1 through n. It must be noted that there can be more or less than n streams, and this is just for purposes of discussion. The structure and the method will be discussed relevant to stream 1.

Therefore, complete transport packets for stream 1 are passed from the primary multiplexer 14 to the transport buffer 20a for stream 1. All the bytes that enter the transport buffer 20a are removed at a predetermined rate. Bytes that are part of an MPEG section are delivered to the smoothing buffer(1) 22a. Other bytes that are not part of the MPEG section may be used to control the system.

Bytes associated with a synchronized data elementary stream are transferred to the corresponding data elementary buffer. For example, the data elementary stream for data elementary stream 1 in the MPEG program element 1 would go to data elementary buffer (DEB) (1,1) 24a. Only bytes associated with a DAU are transferred to the DEB. Some bytes may be header bytes or error control bytes. These are discarded.

For purposes of discussion only, specific table ids and extension values can be followed through the system. At demultiplexer 14, for example, packets with the same PID 0x0FDA will be sent to transport buffer 20a and smoothing buffer 22a. At second demultiplexer 23a, the table_id_extension values are used to identify the secondary channel on which a data elementary sub-stream is being conveyed, thereby allowing information from multiple sub-streams to be multiplexed into one MPEG-2 program element. For example, if the table_id is assumed to be 0x3C, the extension value 0xABCD may be sent to DEB(1,1), and 0x9876 to DEB (1,2). This process may continue until the data for a table_id_extension corresponding the kth DEB for stream 1.

Figure 4:
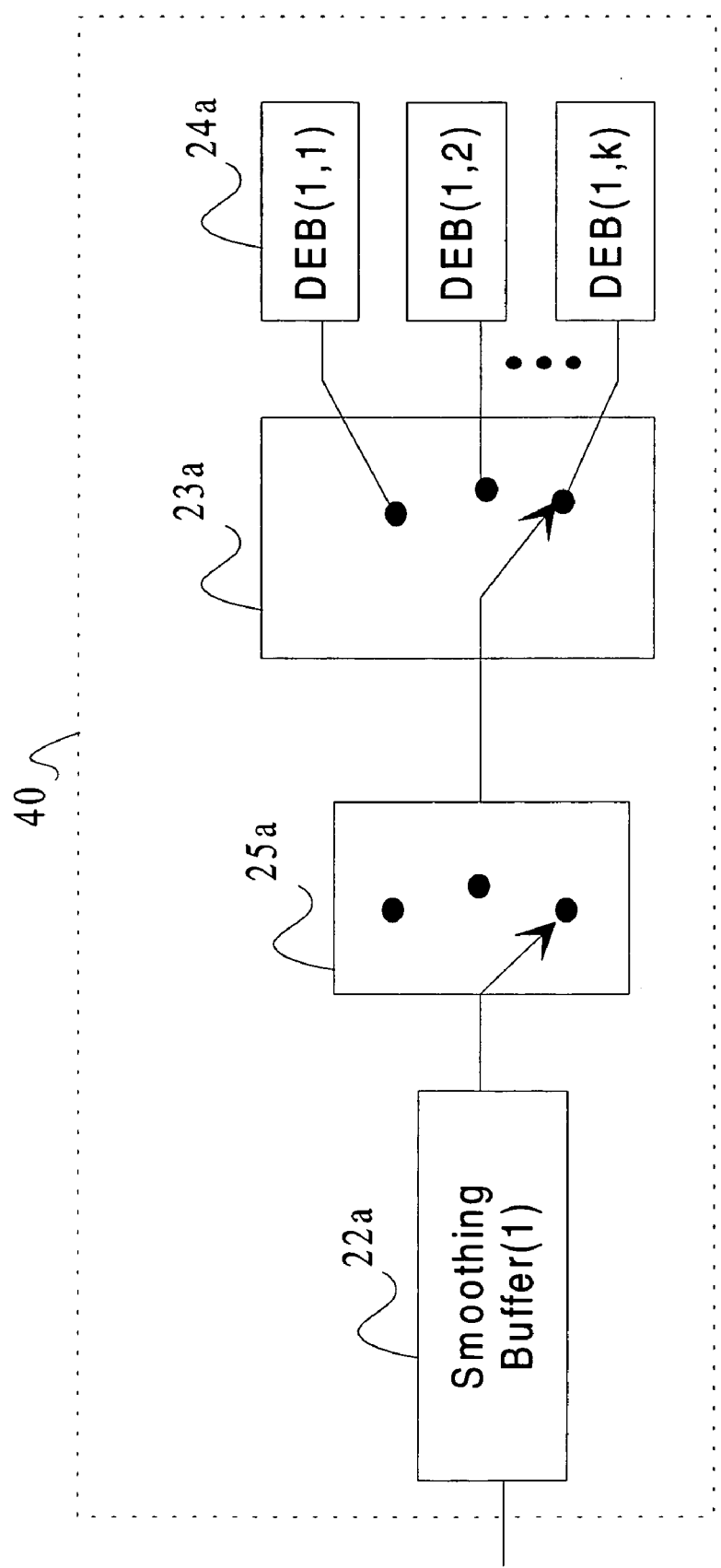
FIG. 4 shows a detailed block diagram representation of one embodiment of a transport stream decoder with secondary multiplexing.

The invention can be extended to include other types of data than synchronized data for a given program element. As can be seen in FIG. 4, a more detailed view of an alternative to the components contained in box 40 of FIG. 3 is shown.

In this instance, the table_id is such that it does not correspond to the table_id for synchronized data, but is part of a table for asynchronous data. This asynchronous data is removed prior to or in conjunction with the secondary multiplexing. FIG. 4, as an example, shows a third demultiplexer 25a that operates on the table_id field values. In implementation, however, this demultiplexing task could be performed by the same demultiplexer that performs the table_id_extension based demultiplexing. Alternatively, it could be performed by some other type of circuitry that has the capability of recognizing a certain table_id and switching data associated with that table_id to a different path.

In summary, then, the first demultiplexer assigns packets based upon the PID value, which identifies the MPEG-2 program element to which the packet belongs. This is the current state of the art in MPEG-2 receivers. The second multiplexer assigns packets based upon the table_id and table_id_extension, allowing multiple elementary streams within that program element to be transmitted. This solution allows multiple data elementary streams to be multiplexed into an MPEG-2 program element in a realizable fashion, unlike the FlexMux proposal.

Thus, although there has been described to this point a particular embodiment for a method and structure for secondary multiplexing of MPEG-2 transport streams, it is not intended that such specific references be considered as limitations upon the scope of this invention except in-so-far as set forth in the following claims.

What is claimed is:

1. A system target decoder operable to receive and process information, comprising:
   a first demultiplexer operable to demultiplex a transport stream into packets each having a given packet identifier;
   at least two transport buffers operable to receive packets from the first demultiplexer, each said transport buffer receiving packets with the same packet identifier;
   a smoothing buffer, corresponding to one of the transport buffers, operable to receive packets from the transport buffer at a predetermined rate;
   a second demultiplexer operable to demultiplex data from within the packets from the smoothing buffer into data access unit data such that the second multiplexer demultiplexes asynchronous data separate from synchronized data; and
   at least two data elementary buffers operable to receive the data access unit data from the second demultiplexer.

2. The decoder as claimed in claim 1, wherein the system further includes a third demultiplexer between the smoothing buffer and the second demultiplexer operable to demultiplex asynchronous data separate from synchronized data.

3. A method of demultiplexing data within a transport stream packet comprising the steps of:
   receiving a transport stream at a first demultiplexer;
   initially demultiplexing the transport stream into packets with a first demultiplexer using packet identifiers;
   buffering the packets from the first demultiplexer in a transport buffer,
   sending the packets from the transport buffer to a smoothing buffer;
   transmitting the packets from the smoothing buffer to a second demultiplexer;
   using information in the packet header identifying data access units to secondarily demultiplex data from within the packet such that asynchronous data is demultiplexed separately from synchronized data; and
   storing synchronized data access units reconstructed from secondarily demultiplexed data in a data elementary buffer.

\* \* \* \* \*